Patented July 14, 1925.

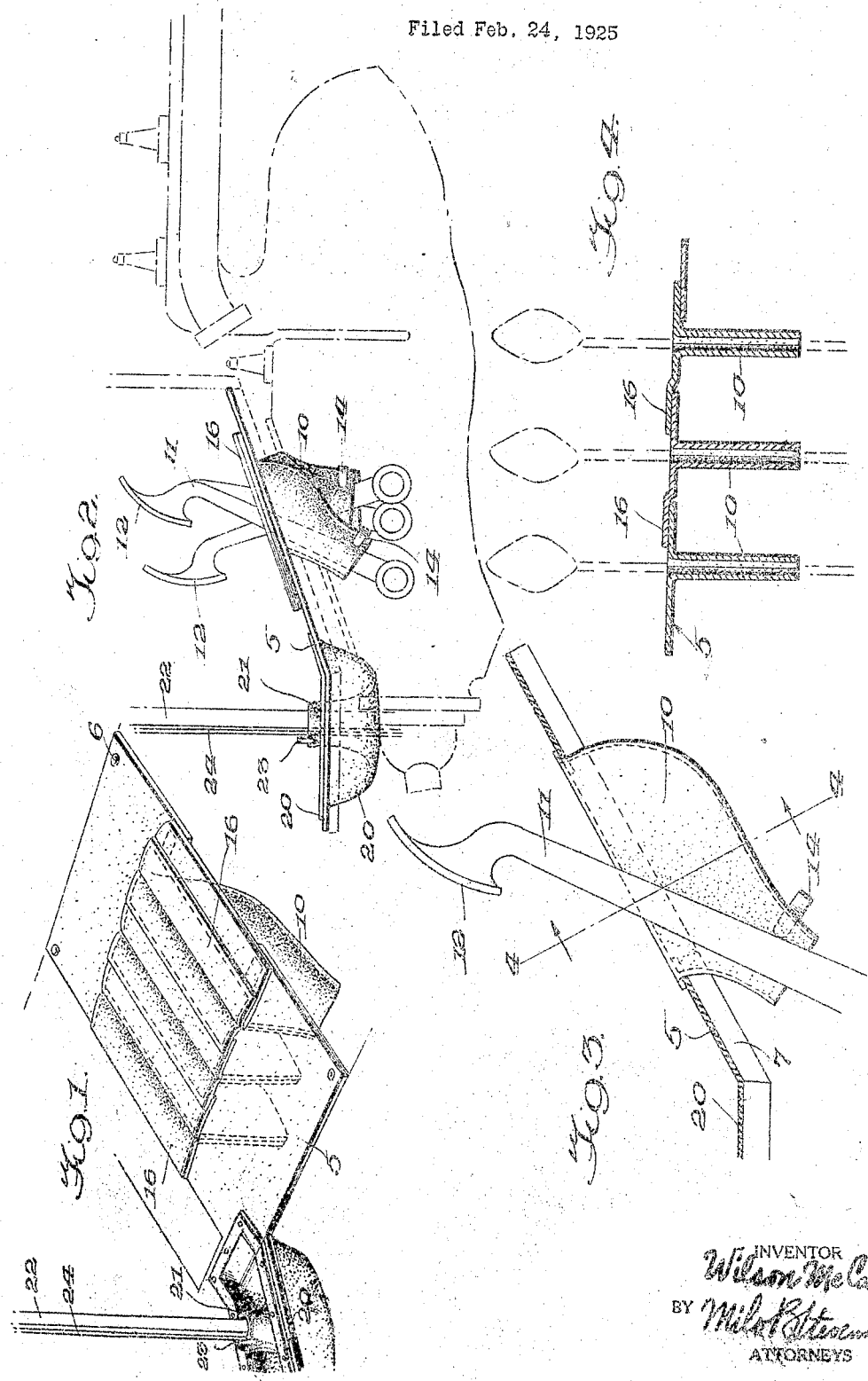

1,545,782

UNITED STATES PATENT OFFICE.

WILSON McCAW, OF PAXTON, ILLINOIS.

DRAFT SHIELD.

Application filed February 24, 1925. Serial No. 11,354.

*To all whom it may concern:*

Be it known that I, WILSON McCAW, a citizen of the United States, residing at Paxton, in the county of Ford and State of Illinois, have invented new and useful Improvements in Draft Shields, of which the following is a specification.

This invention relates to windshields or guards especially adapted for use in connection with the foot pedals and hand lever or levers on automobiles.

Briefly stated, an important object of this invention is to provide a shield of the character specified which may be conveniently applied to a Ford or other automobile without marring the appearance of the automobile and without interfering with the operation of the automobile.

A further aim is to provide a windshield of the character specified which is of highly simplified construction, durable in use, and cheap to manufacture.

In the accompanying drawings forming a part of this application, and in which like numerals are employed to designate like parts throughout the same.

Figure 1 is a perspective of the improved shield.

Figure 2 is a side elevation of the same applied.

Figure 3 is a sectional view through the improved shield applied.

Figure 4 is a transverse section taken on line 4—4 of Figure 3.

In the drawing, wherein for the purpose of illustration is shown a preferred embodiment of the invention, the numeral 5 designates a piece of flat, preferably waterproof material such as leather, leatherette, heavy canvas or the like and which is provided at suitable points with fastening devices 6 by means of which the same may be detachably connected to the floor board 7 of the automobile. Figure 1 plainly illustrates that a plurality of sleeves 10 depend from the body 5 and are adapted for the reception of the shanks 11 of the foot pedals 12. The sleeves 10 are tapered toward their lower ends as the movement of the pedal shanks adjacent the lower ends thereof is substantially less than the movement of the portions of the shanks adjacent the foot pedals 12. However, the narrow openings in the lower ends of the sleeves 10 are larger than necessary to receive the shanks 11 whereby the sleeves may be inserted over the pedals 12. After the sleeves have been positioned on the pedal shanks 11, the lower ends of the same may be engaged by spring clips 14, the spring clips forming a means to close the space between the pedal shanks and the remote edges of the sleeves. In other words, the clips 14 take up the excess space in the openings in the lower ends of the sleeves when the sleeves are in place on the pedal shanks.

The sleeves 10 may each be formed from two similarly cut and shaped pieces of material having their upper portions extended in opposite directions to provide attaching flaps 16 which may be secured by stitching or other suitable means to the upper side of the body 5. Of course, the sleeves 10 are extended through suitable incisions in the body 5.

Figure 1 illustrates that the body 5 may be provided near one corner thereof with an extension having a more or less elongated recessed portion 20 of rubber or the like. The bottom of the recessed portion 20 is extended upwardly into the form of a tapered cuff 21 to receive the hand lever 22. A suitable clip 23 may be employed to hold the upper portion of the tapered elastic cuff-like member 21 in place about the lever 22 and the link 24, which in accordance with standard practice extends substantially parallel to the lever. As is well known, the lower portion of the link 24 is provided with a dog which operates over a segmental rack to hold the lever in an adjusted position.

In the installation of the invention, the floor boards are preferably removed, and when the tapered sleeves 10 are applied to the shanks 11, the shanks may be freely operated by the driver of the vehicle. A rug or mat may extend over the body 5 and will effectively conceal the same.

A windshield constructed in accordance with this invention will effectively prevent the cold air from coming up through the slots in the floor board and oil fumes, etc., will also be prevented from coming up through the floor board.

Having thus fully described my invention what is claimed is:—

1. A shield for automobiles comprising a body having means whereby the same may be applied to a floor board, and being provided with incisions, and sleeves of tapered formation extending through said incisions and adapted to receive the foot pedals of an automobile.

2. A shield for automobiles comprising a body having means whereby the same may be applied to a floor board, and being provided with incisions, and sleeves of tapered formation extending through said incisions and adapted to receive the foot pedals of an automobile, the upper portions of said sleeves being provided with oppositely extending flaps permanently secured to said body.

3. A shield for automobiles comprising a body having means whereby the same may be applied to a floor board, and being provided with incisions, sleeves connected to the walls of the incisions, and clips engaged with the lower portions of the sleeves to take up the space between the lower portions of the sleeves and the pedals.

4. A shield for automobiles comprising a body having means whereby the same may be applied to a floor board, and being provided with sleeves, and clips engaged with the lower portions of the sleeves to take up the space between the lower portions of the sleeves and the pedals, the sleeves being adapted to extend to a point beneath the running board of an automobile and engage the clutch pedal shanks near the lower ends of the same.

5. A shield for automobiles comprising a body having means whereby the same may be applied to a floor board, and being provided with sleeves, and clips engaged with the lower portions of the sleeves to take up the space between the lower portions of the sleeves and the pedals, the sleeves being adapted to extend to a point beneath the running board of an automobile and engage the clutch pedal shanks near the lower ends of the same, and a depending cuff of rubber carried by said body and adapted to receive a hand lever and a link of the same.

6. A shield for automobiles comprising a body having means whereby the same may be applied to a floor board, and being provided with sleeves, and clips engaged with the lower portions of the sleeves to take up the space between the lower portions of the sleeves and the pedals, the sleeves being adapted to extend to a point beneath the running board of an automobile and engage the clutch pedal shanks near the lower ends of the same, and a sunken and dilating cuff of rubber carried by said body and adapted to receive a hand lever and a link of the same, and a clip to securely connect the upper portion of said cuff to said lever and said link.

7. A shield for automobile floor boards comprising a body having a depending elongated member of elastic material having its major portion disposed below the plane of the floor board and provided with a centrally arranged upwardly extending tapered cuff-like member to receive a hand lever of an automobile, and a clip to securely hold the upper portion of the cuff-like member in engagement with said hand lever.

In testimony whereof I affix my signature.

WILSON McCAW.